United States Patent [19]
Alexander

[11] Patent Number: 5,881,414
[45] Date of Patent: Mar. 16, 1999

[54] LOADING DOCK WITH ADJUSTABLE BUMPERS

[75] Inventor: James C. Alexander, London, Canada

[73] Assignee: United Dominion Ind., Inc., Charlotte, N.C.

[21] Appl. No.: 757,944

[22] Filed: Nov. 27, 1996

[51] Int. Cl.⁶ .................................................. E01D 1/00
[52] U.S. Cl. ............................ 14/71.1; 14/71.3; 14/71.7
[58] Field of Search ................................. 14/69.5, 71.1, 14/71.3, 71.7, 71.5, 72.5; 52/173.2; 414/401, 402

[56] References Cited

U.S. PATENT DOCUMENTS

| | | | |
|---|---|---|---|
| 3,230,675 | 1/1966 | Frommelt et al. | 52/173.2 |
| 3,583,014 | 6/1971 | Brown et al. | 14/71.3 |
| 3,584,324 | 6/1971 | Merrick | 14/71.3 |
| 3,840,930 | 10/1974 | Wanddell | 14/71.3 |
| 4,420,849 | 12/1983 | Alten | 14/71.3 |
| 4,815,918 | 3/1989 | Bennett et al. | 414/401 |
| 5,586,356 | 12/1996 | Alexander | 14/71.1 |

*Primary Examiner*—James A. Lisehora
*Attorney, Agent, or Firm*—Sughrue, Mion, Zinn, Macpeak & Seas, PLLC

[57] ABSTRACT

An adjustable bumper system for use at a loading dock which has a dock leveler having a deck pivotally mounted to a portion of the dock. The dock leveler has a lip pivotally attached to one end of said deck. The bumper system has a pair of support members each mounted to a portion of the dock. The support members may be pivotally mounted and extend along sides of the deck of said dock leveler. The support members may also be mounted to the dock face and move vertically. Dock bumpers are mounted to each support member and are positionable between two different vertical positions as the support member is moved. The dock bumpers project outward from the dock beyond the pendent lip and are adjustable to engage the rear of vehicles having different heights.

14 Claims, 5 Drawing Sheets

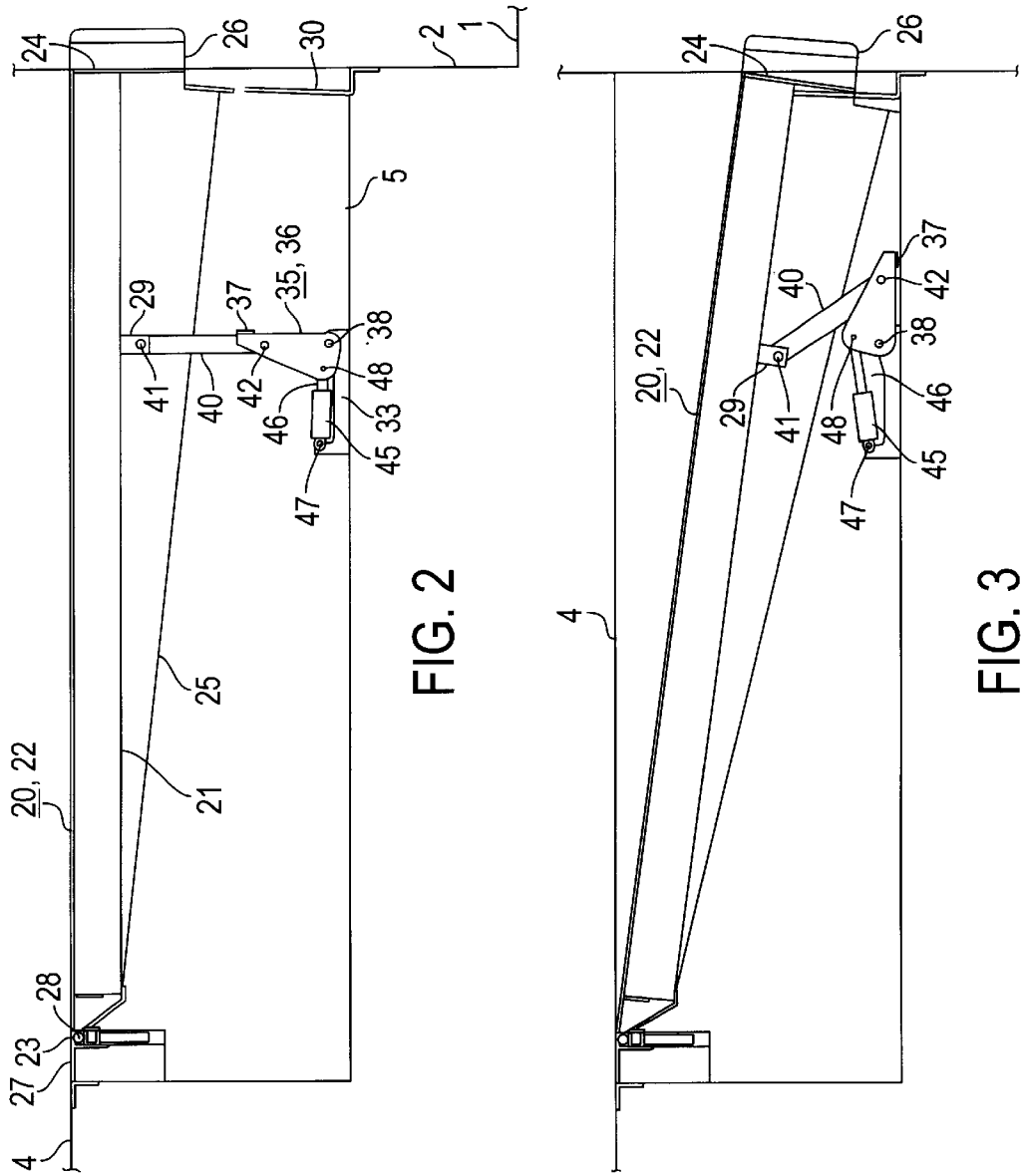

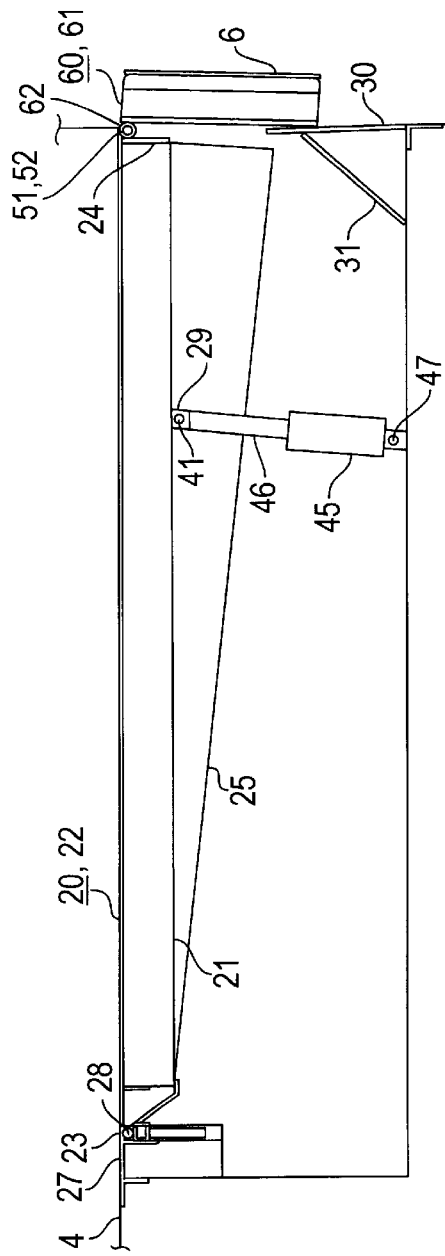
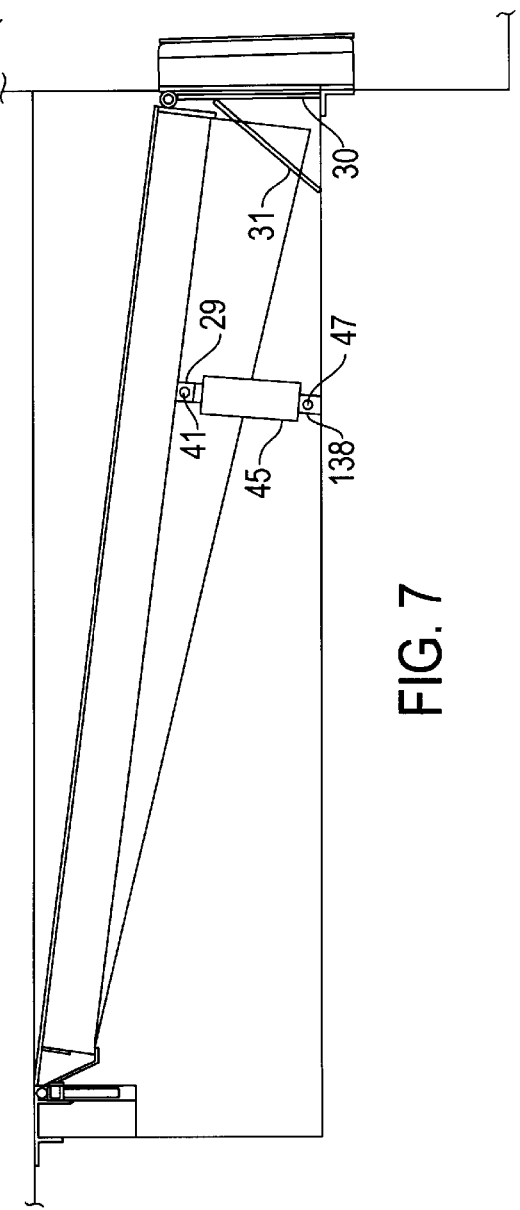
FIG. 6
FIG. 7

LOADING DOCK WITH ADJUSTABLE BUMPERS

BACKGROUND OF THE INVENTION

1. Field of the Invention

This invention relates to loading dock equipment and in particular to a dock structure having bumpers that are vertically adjustable to accommodate vehicles of different sizes.

2. Prior Art

Most loading docks are designed for standard truck trailers which typically have a bed height of 48 to 52 inches. Many new "high-cube" trailers have a bed height of 32 to 36 inches. The difficulty is that dock bumpers placed high enough for a standard trailer will impede access to low trailers. Conversely, bumpers placed for the low trailers will allow standard trailers to pass over and impact the building. There are several conventional solutions to accommodate both low and standard height trailers but all involve compromises that impede effective dock operations.

The simple solution is to have separate docks, each having the proper height for the trailer, but this increases cost of a dock installation and reduces the flexibility of a single dock to handle various trailers. As a consequence the dock may be unoccupied for periods of time because the trailers do not match the configuration.

Another solution is to use wheel riser ramps or hydraulic truck levelers mounted on the driveway. However, this solution interferes with the ability of vehicle restraints to engage the ICC bar of the low trailer when it is raised to dock height, and also interferes with snow removal in northern climates. Some low trailer applications can be serviced by using long dock levelers with extended below dock range. However, most dock levelers are limited to 7 feet width as a wider leveler would not allow sufficient space at each side to mount the bumpers to engage the trailer and if the cargo to be loaded is the full width of the trailer, it will not pass between the sides of the leveler pit when the leveler is below the dock floor. It is also expensive to install.

SUMMARY OF INVENTION

Given the current state of dock implementation it is therefore an object of this invention to provide for an improved dock structure that is fully functional for trailers of differing configurations.

It is a further object of this invention to provide a system of adjustable height bumpers whose position can be changed to match the height of trailers to be parked at the dock.

A further object of this invention is to provide an adjustable bumper that is low in cost and whose installation and use is compatible with standard loading dock equipment.

These and other objects of this invention are accomplished by a loading dock which allows full access to both standard height and low trailers. This invention uses a standard height dock and standard width dock leveler to accommodate both low and standard height transport vehicles by mounting the bumpers on adjustable beams on each side of the dock leveler. In accordance with a first embodiment of this invention, when a standard height vehicle is at the dock, the top of the beam carrying the bumper is level with the dock floor and the bumpers are at the normal dock height. When a low vehicle is at the dock, the beam is lowered to place the bumpers at the lower height and to allow the full width of the door to be clear for wide cargo. In this embodiment the beam is pivotally mounted to the frame of the dock leveler or to the pit and supported by a lever mechanism having two operative positions.

In accordance with a second embodiment of the invention, the lever mechanism is replaced with a hydraulic cylinder to provide variable vertical adjustment. In a third embodiment, the bumpers are mounted to the face of the dock on a track and are moved vertically into position by an operating cylinder, manual crank or the like.

This invention will be described in greater detail by referring to the drawing and the description of the preferred embodiment that follows.

BRIEF DESCRIPTION OF THE DRAWING

FIG. 2 is a side view of the bumper support system illustrating a hydraulic cylinder and the mechanism which supports the beam in the raised position;

FIG. 3 is a side view of the bumper support system with the bumper support beam lowered;

FIG. 6 is a side view of a second preferred embodiment of the bumper support system illustrating a hydraulic mechanism which directly supports the beam in the raised position;

FIG. 7 is a side view of the second preferred embodiment of the bumper support system with the bumper support beam lowered;

DESCRIPTION OF THE FIRST PREFERRED EMBODIMENT

Figure 1:
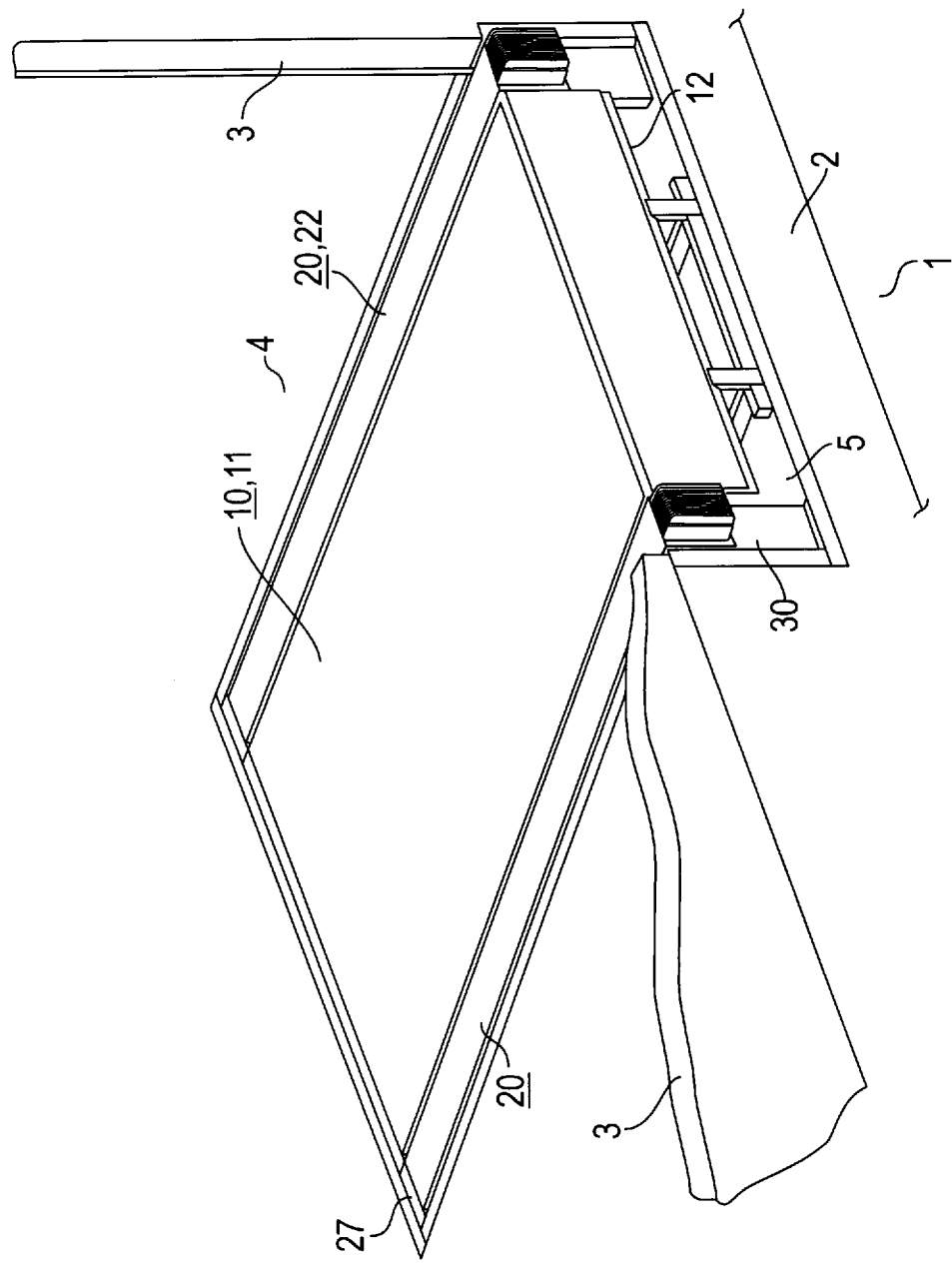
FIG. 1 is a perspective view of a preferred embodiment of this invention with the dock bumpers at floor level for standard height transport vehicles.

Referring now to FIG. 1, the loading dock is shown with a driveway approach 1, a dock face 2, a wall 3 (partially cut away), and a dock floor 4 with a recessed pit 5. The pit 5 is wider than a conventional dock leveler pit to accept both a dock leveler 10 and two bumper support beam assemblies 20. The dock leveler 10 has a conventional hinged deck assembly 11 and hinged lip assembly 12. The bumper support beam assembly 20 is shown in greater detail in FIG. 2. The beam assembly has a beam structure 21, top plate 22 which acts as part of the dock floor when the beam is level, a rear hinge 23 and a front plate 24. A toe guard 25 is mounted on the side toward the dock leveler to prevent a hazardous pinch point when the dock leveler 10 is below the beam . A conventional bumper 26 is mounted on the front plate 24. A rear hinge bracket 27 is fastened to the rear corners of the pit 5 and carries the hinge 23 of the beam assembly 20 through a pin 28. A stop bar 30 is attached to each side of the front of the pit 5 and supports the front of the beam 20 when it is in the lowered position.

The beam is moved and held in the raised position by a hydraulically operated lever mechanism as shown. A base bracket 33 is fastened to the floor of the pit 5. A lever assembly 35 has two arms 36 joined by a stop bar 37 and is carried on the bracket 33 by a pin 38. A bar 40 pivots on a pin 41 attached to a bracket 29 on the beam assembly 20 and to the lever assembly 35 by a pin 42. A hydraulic cylinder 45 is mounted to the base bracket 33 by a pin 47 and the extendible cylinder rod 46 is attached to the lever assembly 35 by a pin 48.

The operation of the system in accordance with this first preferred embodiment will now be described. FIG. 1 shows the bumper support beam assemblies 20 and the dock leveler 10 stored at floor level. When the beam assembly 20 is in the raised position, the linkage mechanism is locked in an "over-center" position with the stop bar 37 in contact with the bar 40 as shown in FIG. 2. Thus the beam assembly acts as part of the dock floor and any load on the beam is carried by the linkage members 35 and 40 and not by the hydraulic cylinder 45. In this position the bumpers 26 can engage a trailer of normal height and protect the dock face and the rear of the truck form damage.

When a low truck is to be loaded or unloaded, a conventional hydraulic system and control circuit (not shown) causes the rod 46 to retract into the hydraulic cylinder 45. The lever assembly 35 rotates to the position shown in FIG. 3 and the beam assembly 20 lowers until it is supported on the stop bar 30. This condition is illustrated in FIG. 3. Thus, this embodiment provides two positions for the bumpers as a function of the bed height of the truck to be loaded or unloaded.

Figure 4:
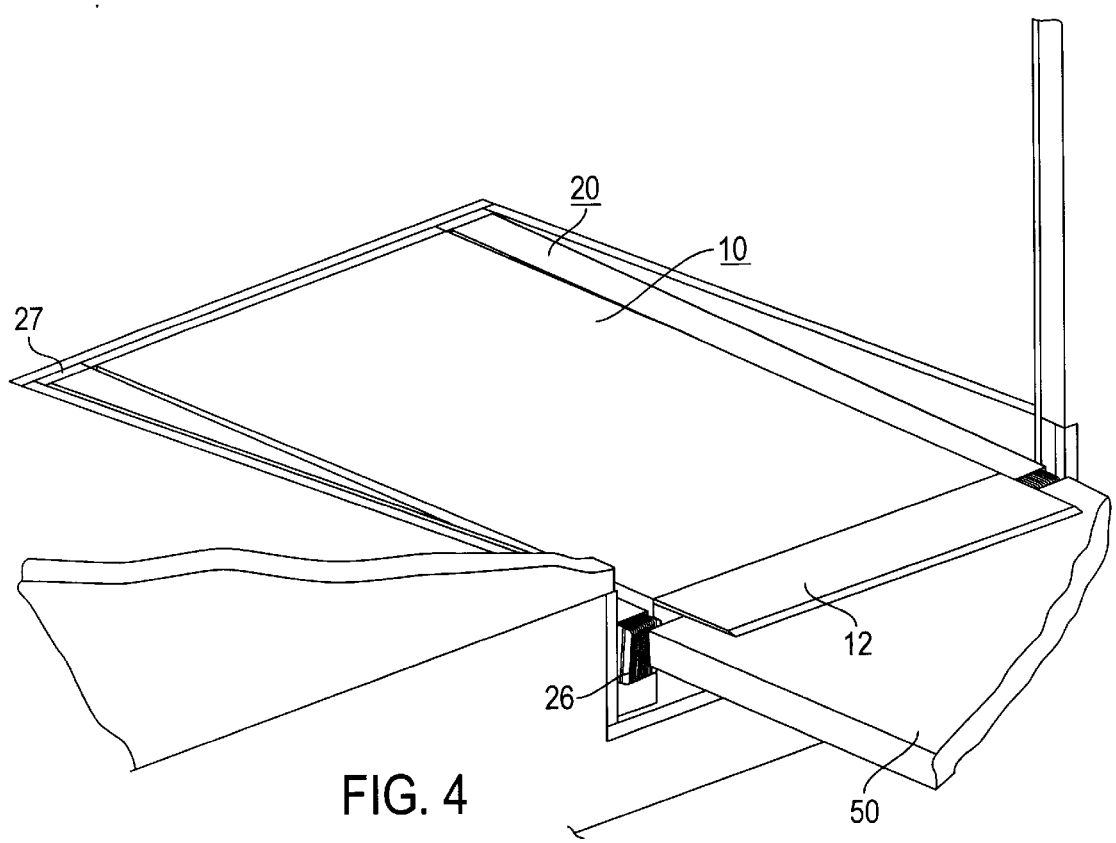
FIG. 4 is a perspective view of the dock with the bumpers lowered for low transport vehicles and the leveler with the lip of the dock leveler extended to rest on the bed of the transport vehicle.

FIG. 4 shows the dock with the beams 20 lowered and the leveler 10 with the lip 12 of the dock leveler 10 extended and resting on the bed of a transport vehicle 50. The top of the beam assembly 20 is below the top surface 11 of the dock leveler 10 so that there is no restriction to the width of cargo which can be carried into the vehicle. In this position a low trailer is protected from damage, since as illustrated, the rear of the trailer will impact the bumper 26 and not the dock face.

Figure 5:
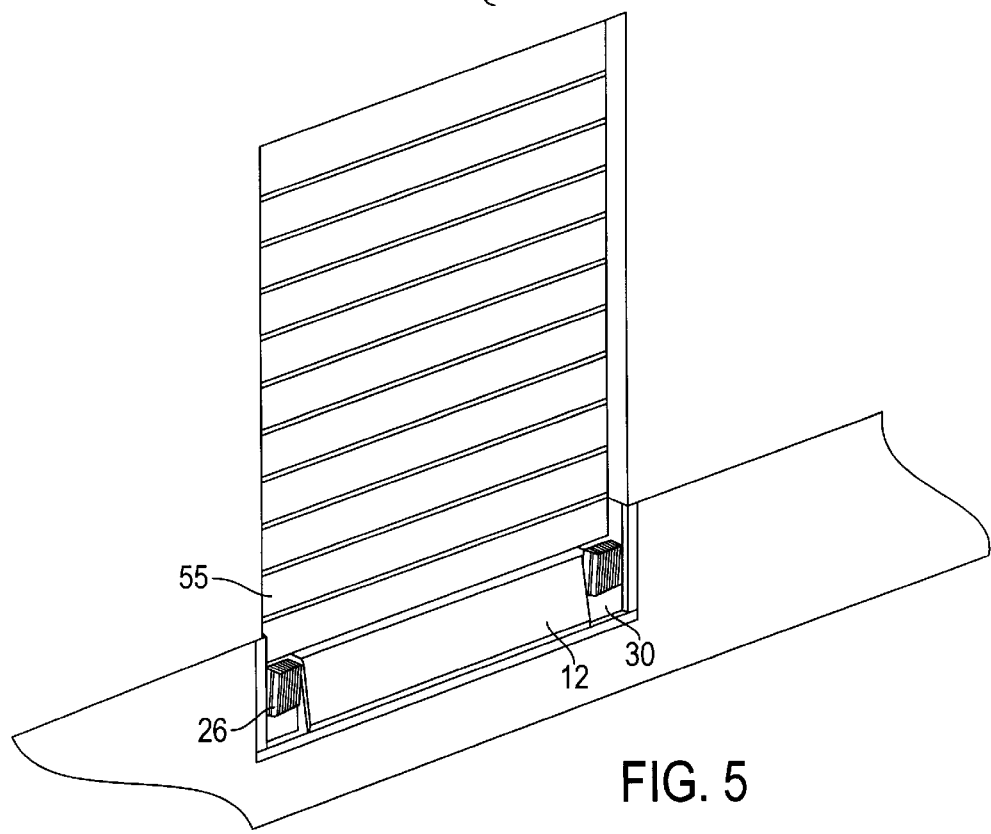
FIG. 5 is a perspective view of the dock with the bumpers lowered for low transport vehicles and the leveler at the lowest position with the door closed and resting on the leveler and the top of the bumper support beans to seal the door opening.

FIG. 5 illustrates the bumpers lowered for low transport vehicles and the leveler at the lowest position for "end loading" or removing cargo from the end of the vehicle without the lip extended. FIG. 5 shows that the loading dock door can be lowered onto the leveler in this position as well as the conventional position at floor level if the dock is to be used primarily for low trucks. The stop bar also acts as a barrier sealing of the underside of the support beams, thus providing a degree of security and environmental protection. In this embodiment the stop bar 30 is mounted on the pit floor. It could be carried by the support beam 20 as a leg.

This invention is not limited to the specific configuration described above. While the dock shown is for standard height vehicles, this design could be equally as effective for a dock built at a lower height. The lowered position of the bumpers would then be at floor level and the raised position would be above floor level. Similarly, a more complex control system could allow the bumper support beams to be supported at more than two positions.

Also, the hydraulic cylinders could be operated by adding valves to the hydraulic circuit of a conventional hydraulic dock leveler. A mechanical dock leveler could be used and the adjustable bumpers could have a dedicated hydraulic system. Alternatively, the hydraulic cylinders could be replaced by electrical actuators. In these situations the two bumpers could be moved into position together or separately depending on the use of a unitary or separate source of power to drive each linkage. Additionally, the bumper support beams could be counterbalanced with springs so that they could be moved manually and held in each position by a mechanical latch.

DESCRIPTION OF THE SECOND PREFERRED EMBODIMENT

Referring now to FIGS. 6 and 7, a second preferred embodiment is illustrated .the loading dock is shown similar to FIG. 1. Instead of having the bumper mounted directly to the front plate 24, hinge tubes 51 are attached to the plate 24. The bumper assembly 60 has hinge tubes 62 which are pivotally attached to the hinge tubes 51 by a pin 52. The bumper is therefore free to pivot on the hinge. The bumper assembly 60 is shown with a steel face 63 covering the rubber portion of the bumper 61, providing longer life and allowing the bumper to slide more easily against the rear of the vehicle. While the figures illustrate a single bumper, it will be appreciated that second one may be place on the opposite side of the dock leveler.

The stop plate 30 is placed at the front of the pit and provides support for the bottom of the bumper. The plate 30 is provided additional structural support by the plate 31. By having only the top of the bumper assembly 60 attached to the front of the beam assembly 20, the bottom of the bumper can be held at a constant horizontal position relative to the dock face 2 rather than receding into the pit on a circular arc as shown in FIG. 3. Also the face of the bumper is held in a more vertical plane than when the entire bumper is rotated with the beam.

The beam is moved and held in the raised position by a hydraulic cylinder rod 46 which is fastened to the beam assembly 20 by a pin 41 and bracket 138 attached to the floor of the pit 5.

The operation of the system is essentially as described for the first preferred embodiment except that the hydraulic cylinder can support the beam at any height and is not confined to having only two positions. It is apparent that the rod 46 may have any degree of extension between fully extended and fully retracted thereby providing more precise positioning of the bumper 60. Also, as illustrated in FIGS. 6 and 7 the bumper 60 bears on the stop plate 30 to align relative to the vehicle and maintain a more vertical orientation.

DESCRIPTION OF THE THIRD PREFERRED EMBODIMENT

Figure 8:
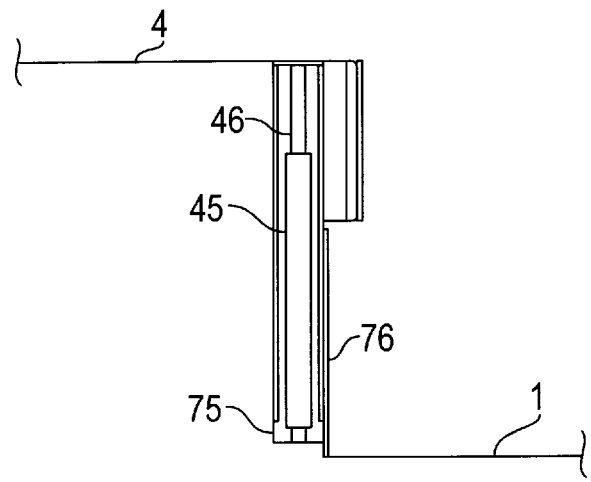
FIG. 8 is a side view of a third preferred embodiment of the bumper support system with the bumper at dock level.
Figure 9:
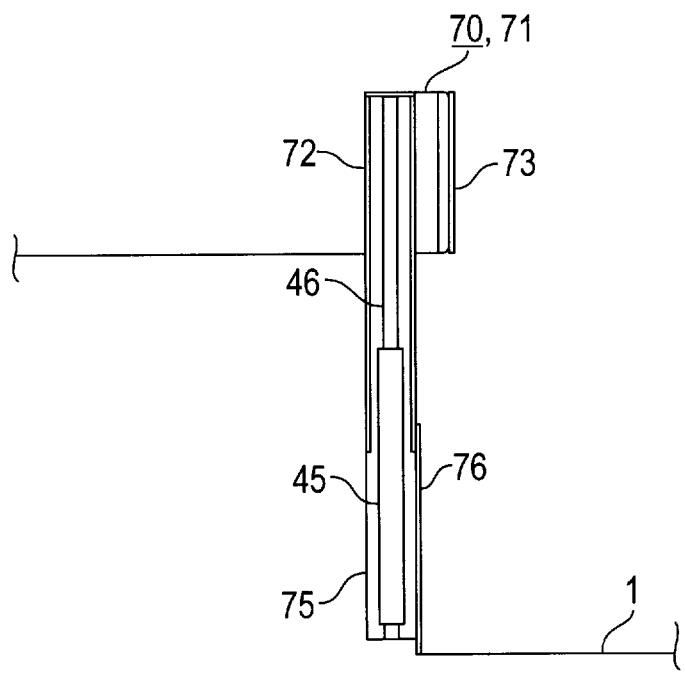
FIG. 9 is a side view of the third preferred embodiment of the bumper support system illustrating a hydraulic cylinder which supports the beam in the raised position above dock level.

If the dock is built to the height of the lowest trailers, then the dock leveler will operate only above the dock floor and the sides of the pit will never interfere with wide cargo. Although the two preferred embodiments previously described would operate above dock as well as below, there is no interference with the pit sides and therefore no requirement for the beams to move with the bumpers. FIGS. 8 and 9 show a third embodiment of the bumper assembly. In this preferred embodiment, the bumper 70 has a bumper 71, hollow support beam 72 and a steel face 73. The face of the dock has a recessed cavity 75 which is closed on the front by a plate 76. A hydraulic cylinder 45 is attached to the base of the cavity and an extendible rod 46 is attached to the bumper assembly 70. When a low trailer is parked at the dock, the bumper is stored in the lowered position as shown in FIG. 8. When a standard height truck is to be loaded, the rod 46 extend from the hydraulic cylinder 45 and raises the bumper to the required height. As in the prior embodiment, only one bumper is illustrated but a second one on the opposite side of the door may be used.

Other variations of this invention are within its scope. For example while the support beam assembly is described as pivoted it can be moved in a substantially vertical direction on guides or the like. The support beam assembly can therefore be eliminated. In the case of the third preferred embodiment the bumpers can be simply mounted on rails on the dock face and positioned at different vertical positions depending on the configuration of the truck. Simple mechanical stops an be employed and the bumpers positioned by hand.

While hydraulic power is illustrated, other motive sources such as electric motors or mechanical arrangements may be employed.

I claim:

1. A bumper system for use at a loading dock comprising:
   a movable support member mounted to a portion of the dock,
   a dock bumper mounted to said support member and positionable between two different operative outward facing positions to absorb impact as said support member is moved,
   a mechanism operably coupled to said support member to move said support member; and
   wherein said support member is pivotally attached to said dock and said support member further comprises a linkage to brace said support member at an upper position and is collapsible to permit said support member to pivot downward into a lowered position.

2. The bumper system of claim 1 further comprising an hydraulic cylinder coupled to said linkage to extend and collapse said linkage.

3. The bumper system of claim 1 wherein said linkage comprises a lever and a bar attached to said lever, said lever coupled to a floor portion of said loading dock and said bar coupled to said support member, a stop member on said lever to contact said bar, whereby said linkage is locked in an overcenter position by bracing said bar with said stop member to position said support member in a substantially horizontal position.

4. The bumper system of claim 1 wherein said mechanism is an extensible mechanism coupled to said support member to raise and lower said bumper.

5. The bumper system of claim 1 wherein said support member is mounted to a front face of said dock.

6. The bumper system of claim 5 wherein said mechanism is a vertically moving mechanism coupled to said support member to move it between said two operative outward facing positions.

7. A system for use at a loading dock comprising:
   a dock leveler having a deck pivotally mounted to a portion of said dock, said dock leveler having a lip pivotally attached to one end of said deck,
   a movable support member mounted to a portion of the dock,
   a dock bumper mounted to said support member and positionable between two different operative positions as said support member is moved, said dock bumper projecting outward from a dock face in both of said two different operative positions to absorb impact and beyond said lip when said lip is in a pendent position,
   a mechanism operably coupled to said support member to move said support member and,
   wherein said support member is pivotally attached to a portion of said dock where said deck is pivotally mounted and said support member further comprises a beam mounted to extend alone side said deck and pivot downward into a lowered operative position as said deck is lowered.

8. The system of claim 7 further comprising an hydraulic cylinder coupled to said beam.

9. The system of claim 7, further comprising a linkage to brace said support, said linkage comprising a lever and a bar attached to said lever, said lever coupled to a floor portion of said loading dock and said bar coupled to said support member, a stop member on said lever to contact said bar, whereby said linkage is locked in an overcenter position by bracing said bar with said stop member to position said support member in a substantially horizontal position.

10. The system of claim 7 wherein said mechanism is an extensible mechanism coupled to said support member to raise and lower said bumper.

11. The bumper system of claim 7 wherein said support member is mounted to a front face of said dock.

12. The bumper system of claim 11 wherein said mechanism is a vertically moving mechanism coupled to said support member to move it between said two operative outward facing positions.

13. A bumper system for use at a loading dock comprising:
   a movable support member mounted to a portion of the dock,
   a dock bumper mounted to said support member and positionable between two different operative outward facing positions to absorb impact as said support member is moved,
   a second support member mounted to a portion of the dock and,
   a second dock bumper mounted to said second support member and positionable between two different operative outward facing positions to absorb impact as second support member is moved,
   wherein said first and second support members comprise beams mounted in parallel for pivotal motion relative to said dock and said first and second bumpers project outward from said dock at substantially the same height.

14. A system for use at a loading dock comprising:
   a dock leveler having a deck pivotally mounted to a portion of said dock, said dock leveler having a lip pivotally attached to one end of said deck,
   a movable support member mounted to a portion of the dock,
   a dock bumper mounted to said support member and positionable between two different operative positions as said support member is moved, said dock bumper projecting outward from a dock face in both of said two different operative positions to absorb impact and beyond said lip when said lip is in a pendent position,
   a second support member mounted to a portion of the dock and,
   a second dock bumper mounted to said second support member and positionable between two different operative outwardly extending positions, as second support member is moved,
   wherein said first and second support members comprise beams each mounted on a side of said deck for motion relative to said deck and said first and second bumpers project outward from said dock at substantially the same height.

* * * * *